(No Model.)

T. J. MILLER.
BROADCAST SEED SOWER.

No. 336,421. Patented Feb. 16, 1886.

WITNESSES
Phil C Dieterich
E. H. Bates

INVENTOR
T. J. Miller
By his Attorney
M. F. Gilmore

UNITED STATES PATENT OFFICE.

THOMAS J. MILLER, OF NORTH MANCHESTER, INDIANA, ASSIGNOR OF ONE-HALF TO GEORGE W. HENRY, OF SAME PLACE.

BROADCAST SEED-SOWER.

SPECIFICATION forming part of Letters Patent No. 336,421, dated February 16, 1886.

Application filed October 14, 1885. Serial No. 179,849. (No model.)

*To all whom it may concern:*

Be it known that I, THOMAS J. MILLER, a citizen of the United States, residing at North Manchester, in the county of Wabash and State of Indiana, have invented certain new and useful Improvements in Broadcast Seed-Sowers; and I do hereby declare the following to be a full, clear, and exact description of the invention, such as will enable others skilled in the art to which it appertains to make and use the same.

Figure 1:
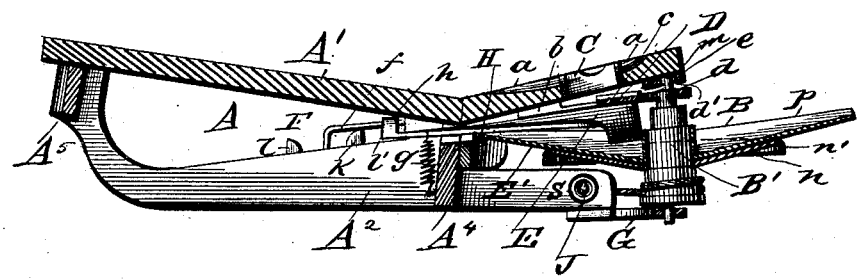
Figure 2:
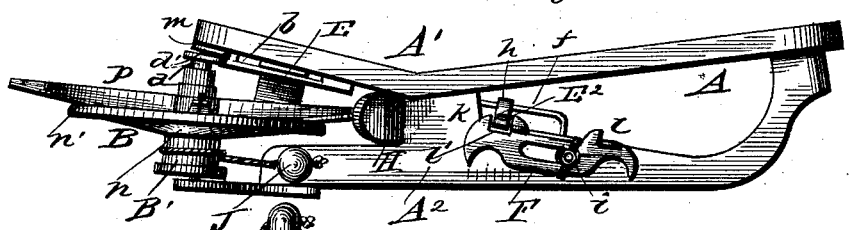
Figure 3:
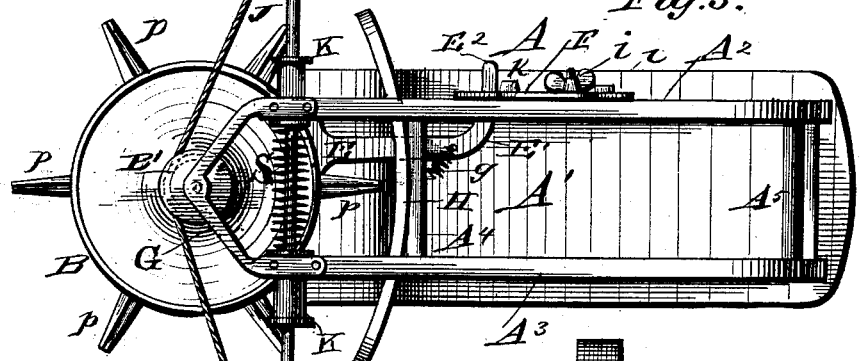
Figure 4:
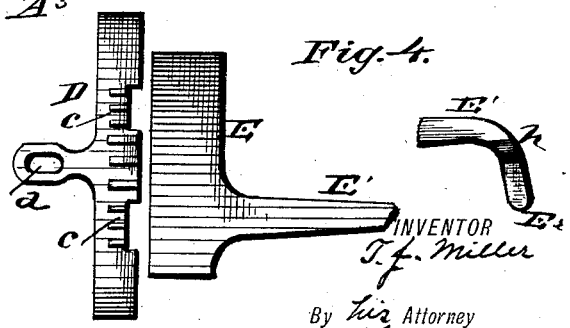

Figure 1 is a section taken vertically and centrally through the machine, with the well-known hopper-sack for containing the seed removed. Fig. 2 is an elevation of the left-hand side of the machine, showing the adjustable gage and indicator for the shut-off slide. Fig. 3 is a bottom view of the machine. Fig. 4 is a top view in detail of the ribbed agitator and shut-off gage.

This invention relates to certain novel improvements in that class of broadcast seed-sowers wherein a ribbed rotary wheel is employed for scattering the seed by centrifugal action, which improvements will be fully understood from the following description, when taken in connection with the annexed drawings.

The main frame A consists of the angular top board, A', two side pieces, $A^2$ $A^3$, shaped like sled-runners, and two cross-pieces, $A^4$ $A^5$, as shown in the annexed drawings. To the edges of the top board, A', the seed-sack will in practice be suitably secured. Near one end of said top board is the rectangular throat, through which the seed pass from the sack to the scattering-wheel B. This throat is lined with a metal frame, C, rigidly secured in place, and having its upper edges scored to correspond to the inclined depressions $a$, leading into it. At the bottom of the frame C are two movable plates, which slide in guides $b\ b$, secured to the bottom of the top board, A'.

The plate D, I denominate the "agitator." It is a narrow plate having ribs $c$ on its upper side and seed-passages in its rear edge. It receives endwise motion in a direction transversely with respect to the length of the machine by means of an eccentric, $d$, on the spindle $d'$, which passes through the hub B' of the scattering-wheel B, which eccentric plays in an oblong slot, $e$, through a front offset of the ribbed agitator D. I thus prevent the seed from clogging the throat of the machine.

The plate E, I denominate the "shut-off" slide. It is adjustable in the direction of the length of the top board, A', for the purpose of regulating the flow of seed to the scattering-wheel or cutting off this flow. This plate E is constructed with an angular arm, E', which passes freely backward through a slot made through the cross-piece $A^4$, and is turned outward laterally through a staple-guide, $f$, so as to form a handle, $E^2$, by means of which the attendant can conveniently draw the plate E backward. This plate is forced forward by means of a spiral spring, $g$, and it is prevented from displacement on the staple-guide $f$ by means of lugs $h$.

F designates a slotted slide-gage, which is applied on the left-hand side of the side piece, $A^2$, and provided with a thumb-screw, $i$, for rigidly fixing it when properly adjusted. This gage is reversible, and it is constructed with hooked pointers designed to point at gage-marks on the face of the side piece, $A^2$, which marks indicate the capacity of the outlet for the seed between the plates D and E. The gage F is constructed with stops $k\ l$, as shown, and a notch $l'$. If the notched end of this gage is forward, the handle $E^2$ is held in the notch $l'$, and the plate E is adjusted and fixed by moving the gage F and tightening screw $i$. If the stop-shoulder $l$ is forward, the attendant adjusts the plate E by hand only so far back as he has set the gage, the spring $g$ moving the said plate forward when the attendant releases the handle $E^2$.

The lower end of the spindle $d$ of the wheel B has its bearing in a bracket, G, secured to the arms of the side pieces, $A^2$ $A^3$, and the upper end of this spindle is journaled in a bearing, $m$, fixed into the bottom of the board A'.

The wheel B consists of a circular dished portion, $n$, re-enforced by an annular depressed flange, $n'$, and provided with a series of radial ribs, $p$, suitably secured to the dished surface of the circular portion $n$, and each one constructed of a single piece of metal bent so as to leave the rib of double thickness and the base-flanges of a single thickness of metal. A scattering-wheel thus constructed is very rigid, and at the same time light.

In rear of wheel B is a curved seed-guard, H, for preventing the seed from being thrown too far in the rear. The wheel B is rotated by means of a bow, J, the cord of which is passed around the cylindrical flanged portion of the hub B'. The bow, which is operated by hand, passes freely through flanged tubes K K, which are endwise movable through the arms of the side pieces, A² A³, and between which tubes is compressed a helical spring, S, the opposite ends of which bear against the inner flanges, $x\ x$, of the tubes K K, and serve to force the tubes outwardly to receive the shock of either end of the rod J, and also for the purpose of affording an easy regular movement of the bow and scattering-wheel.

In practice I prefer to bush with metal the bearings for the flanged tubes K K, to prevent rapid wear.

Having described my invention, I claim—

1. The combination of the frame A, throated, as described, the scattering-wheel, the bow and cord, the ribbed agitator and actuating mechanism, and the plate E, its angular arm, spring, staple-guide, and slotted gage provided with a thumb-screw and gage-marks, the whole constructed and combined as shown and described.

2. In the broadcast seed-sower described, the combination of the spring-actuated bow, its movable flanged tubes, and seed-scattering wheel, as specified.

In testimony whereof I affix my signature in presence of two witnesses.

THOMAS J. MILLER.

Witnesses:
 J. M. BURDGE,
 C. BURDGE.